Sept. 6, 1927.  
W. A. GIBSON  
1,641,807  
CONSTANT TEMPERATURE HEATER FOR SHEET GLASS DRAWING MACHINES  
Original Filed March 2, 1923    2 Sheets-Sheet 1
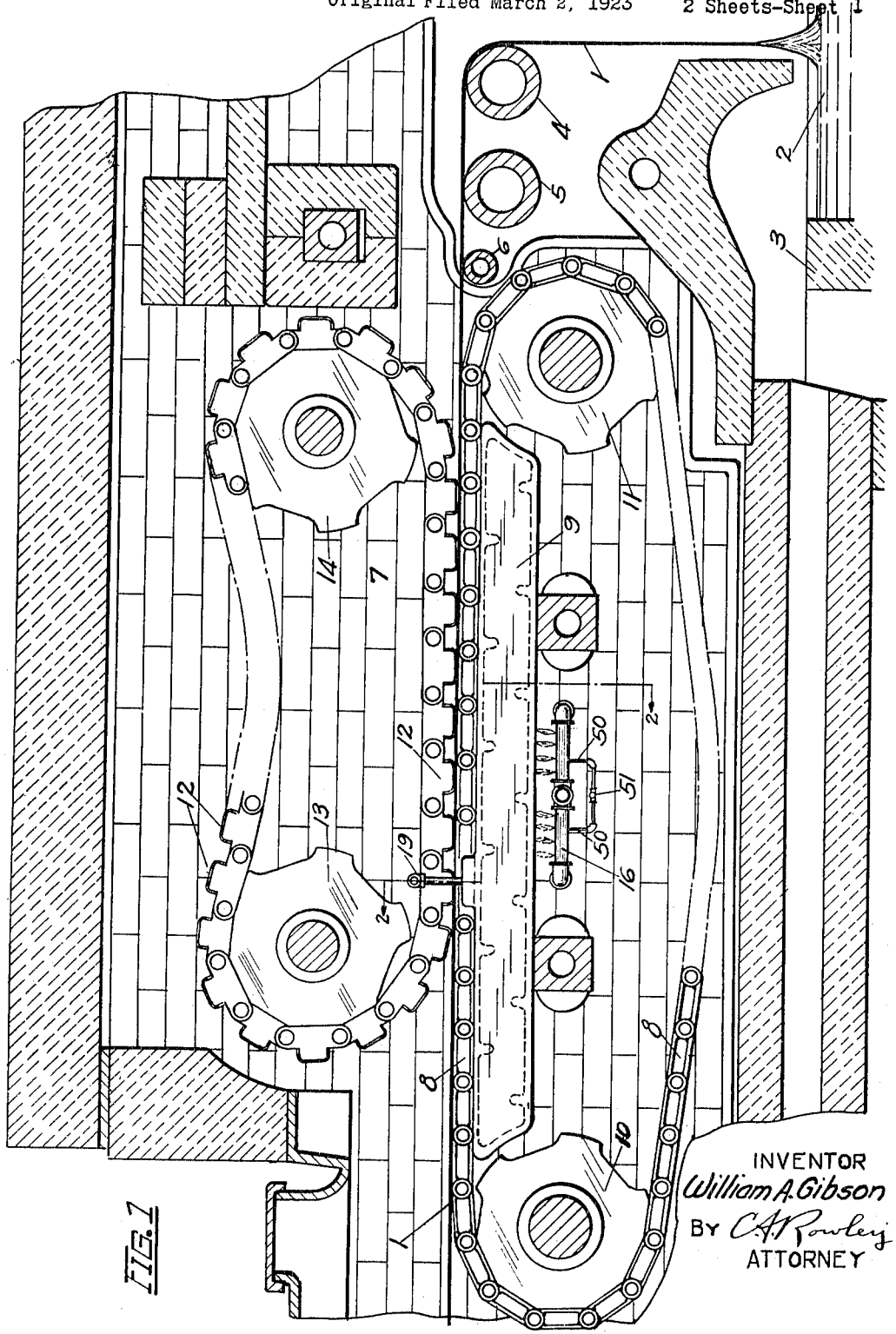
INVENTOR  
*William A. Gibson*  
By *C. A. Rowley*  
ATTORNEY Sept. 6, 1927. 1,641,807
W. A. GIBSON
CONSTANT TEMPERATURE HEATER FOR SHEET GLASS DRAWING MACHINES
Original Filed March 2, 1923 2 Sheets-Sheet 2
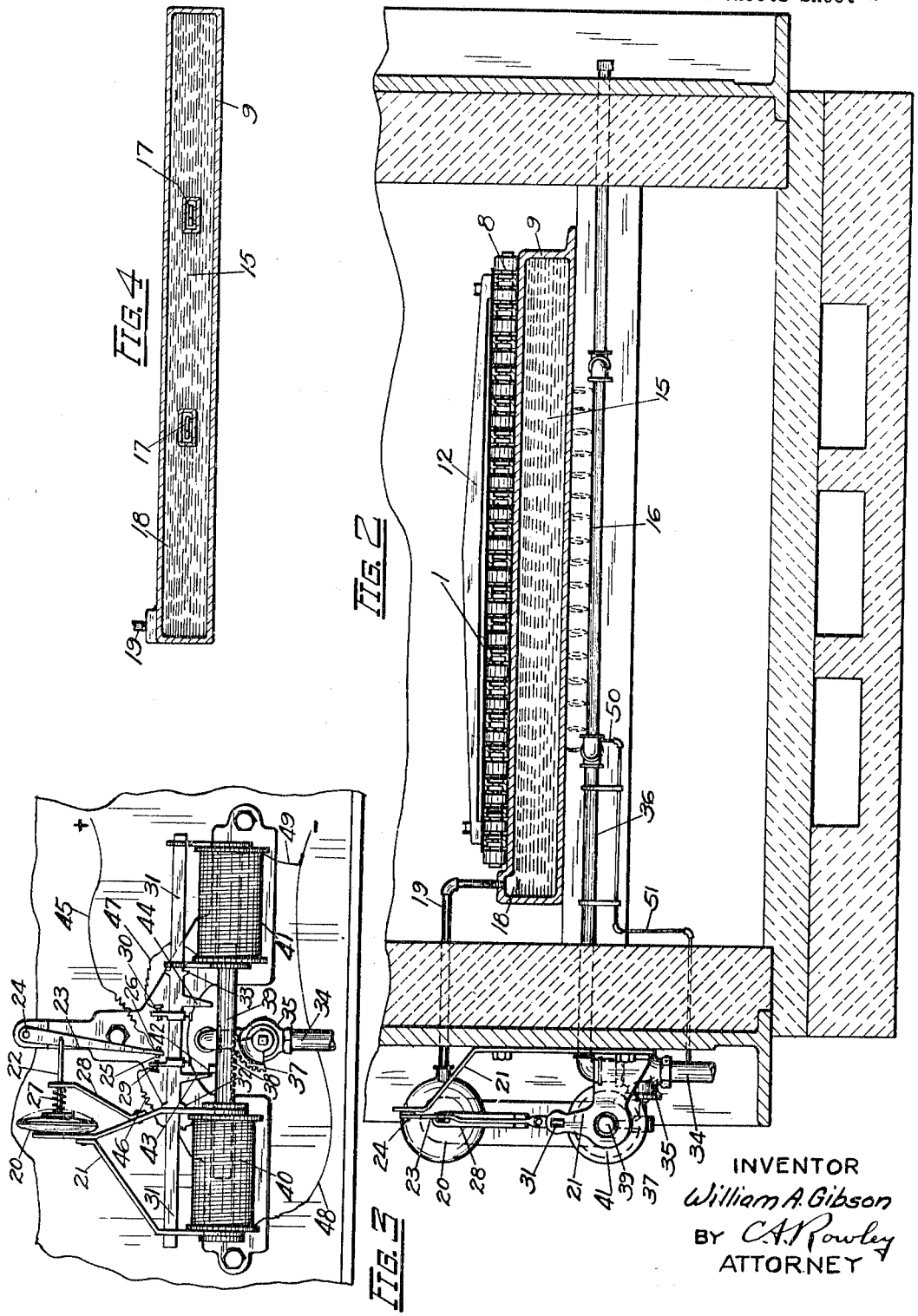
INVENTOR
William A. Gibson
BY C. A. Rowley
ATTORNEY Patented Sept. 6, 1927.

1,641,807

UNITED STATES PATENT OFFICE.

WILLIAM A. GIBSON, OF CHARLESTON, WEST VIRGINIA, ASSIGNOR TO THE LIBBEY-OWENS SHEET GLASS COMPANY, OF TOLEDO, OHIO, A CORPORATION OF OHIO.

CONSTANT-TEMPERATURE HEATER FOR SHEET-GLASS-DRAWING MACHINES.

Application filed March 2, 1923, Serial No. 622,252. Renewed March 22, 1926.

This invention relates to a temperature stabilizing system, and more particularly to a constant temperature heating means especially adapted for use in connection with sheet-glass drawing machines.

In machines of this type, it is necessary to maintain certain fixed temperatures at certain points in the apparatus, or in certain chambers, and it is desirable to have these temperatures remain as steady and constant as possible. The glass sheet during its formative period is very susceptible to slight changes in temperature, and the steadier the temperature controls the more uniform the sheet produced. With the gas flames customarily used it is difficult to obtain either the exact temperature desired, or a constant degree of heat, due to variations in the gas pressure and the quality of the gas.

The object of the present invention is to provide such a heating means with a definite and constant temperature. Use is made of the well-known property of certain materials that, while in transition from the solid to the liquid state, or vice-versa, the temperature will remain constant until all of the material has been melted or solidified. A certain amount of "latent" heat is absorbed by the material in changing it from the solid to the liquid form. If the temperature of the melted material is higher than that of the surrounding substances, it will gradually solidify and give out this heat to the cooler substances, but will retain the same constant temperature until all of the material is solidified. In utilizing this principle to a practical end, a material is selected whose melting point is slightly higher than the temperature to be maintained in the adjacent chamber or objects therein. The material will thus act as a heater for the cooler objects, and the difference in temperature should just balance the heat lost by radiation or carried away by the heated objects. This selected material is enclosed in a suitable container, and is constantly maintained in a partially melted condition by applying heat thereto from an outside source. Automatic means are provided for turning this heat on or off as required.

The invention will be better understood from the following detailed description of one approved form of the apparatus. In the accompanying drawings:

Fig. 1 is a longitudinal vertical section through the flattening chamber of a sheet glass drawing machine, showing this invention applied thereto.

Fig. 2 is a transverse vertical section through the apparatus, taken substantially on the line 2—2 of Fig. 1.

Fig. 3 is an elevation of the automatic burner controller, looking from the left at Fig. 2.

Fig. 4 is a transverse section similar to Fig. 2 through the container for the melted material, showing a modified form of heating means.

In the example here illustrated, the invention is applied to the flattening table of a sheet glass machine of the Colburn type, as substantially described and illustrated in the patent to I. W. Colburn, 1,248,809, granted Dec. 4, 1917. In this apparatus the sheet of glass 1, is drawn up from the mass of molten glass 2, in receptacle 3, and bent over the bending roller 4 into the horizontal. It then passes over the supporting rollers 5 and 6 into the flattening chamber 7. The sheet is carried through this chamber on the endless chain of intermeshing links 8, which form a drawing and flattening table. The upper run of this table of intermeshing links is slidably supported in a flat and horizontal position upon the stationary table 9. The chain-loop 8 is carried at its ends by sprockets 10 and 11. A second endless loop of draw-bars 12, carried by sprockets 13 and 14, rests in its lower run upon the edges of the glass sheet 1, holding the sheet down in frictional contact with the table 8. The loops 8 and 12 are driven at suitable speeds by the sprockets 10 and 13 so that the glass sheet is steadily drawn through the chamber 7 from which it passes into the leer. While the sheet is upon the table 8 it becomes flattened and set in its final form. All of the above is old, as described more in detail in the Colburn patent noted above.

The sheet 1 enters the chamber 7 at one temperature, loses a certain amount of heat while passing through the chamber, and emerges at a somewhat lower temperature. Meanwhile the chamber 7 and the parts located therein are losing heat through radiation and conduction. To maintain this range of temperatures constant it is necessary to supply a certain amount of heat to the chamber 7, to offset these temperature losses. This has formerly been accomplished by locating burners in the chamber 7.

In the improved mechanism here shown, the stationary supporting table 9 is made hollow, and it serves as a container for a mass of material 15 whose melting point coincides with the temperature necessary for the heating medium. Let us assume, merely by way of example, that it is desirable to maintain a constant temperature of 1000° F. within the chamber, and it is found that if this large mass of material 15 (the heat stabilizing body), has a constant temperature of 1010° F., the heat given out to the chamber will just compensate for the temperature losses in the chamber and maintain same at a constant temperature of 1000° F. It is found by experiment, or by consulting research tables, that an alloy of 67% aluminum and 33% copper has its melting point at 1010° F. Accordingly the hollow table 9 is substantially filled with this alloy.

Let us assume the mass of alloy 15 to be in a molten condition, but no further heat is being added thereto. The alloy will commence to solidify, gradually giving out its latent heat of crystallization to the chamber 7 and objects therein. However, the mass 15 remains at its fixed temperature of 1010° F. as long as any of the material remains in a molten state. Before this solidifying or crystallizing process is entirely completed, heat is applied to the mass 15 and it is again slowly melted. This heating means may take any convenient form. As shown in Figs. 1 to 3, a small group of gas burners 16 are arranged centrally beneath the container 9. In Fig. 4, electric heating elements 17 are embodied within the container 9, as will be more specifically described hereinafter. In any case, the heating effect of these primary heating devices should be confined as far as possible to the mass of material 15. All the while the material is being melted, it still retains its melting temperature of 1010° F. and is giving out heat to the chamber 7 at the same rate as while crystallizing. The primary heaters 16 and 17 need not be large, but only sufficient to add more heat to the material than is being simultaneously given out to the chamber 7. Before the material 15 is entirely melted the primary heater 16 or 17 is turned off, and the material again commences to solidify. This cycle is repeated indefinitely, the mass 15 remaining at a constant temperature of 1010° F. and constantly giving off heat at a fixed rate to the chamber 7, and sheet 1 therein.

It is desirable to provide some automatic means for turning the primary heating device 16 on or off at the proper times. In the example here shown, advantage is taken of the fact that materials change volume or density when passing from the liquid to the solid state, or vice-versa. Most materials or metals that would be used in this apparatus have a greater volume when molten than when in the solid state. The container 9 is hermetically sealed, and the slight air-space 18 above the material 15 is in communication through pipe 19 with a sensitive diaphragm 20, mounted on a frame 21 outside of the machine. The diaphragm 20 is connected through link 22 with a lever 23, pivoted at one end 24 to the supporting frame 21, and carrying a pair of switch contacts 25 and 26 at the opposite sides of its free end. A light spring 27, mounted between the diaphragm and a branch 28 of frame 21, helps compress the diaphragm and swing the lever to the left when the pressure decreases within the diaphragm. The contacts 25 and 26 on the lever 23 cooperate with a pair of contacts 29 and 30, adjustably mounted on the bar 31. This bar 31 is mounted for a limited longitudinal sliding movement in the frame 21, its travel in either direction being limited by the stops 32 and 33, which engage adjacent portions of the supporting frame.

The gas for burners 16 passes from supply pipe 34 through valve 35, and pipe 36 to the burners. The valve 35 is of a type that may be turned on or off by oscillating the valve stem through approximately 90°, and this valve is controlled by the gear segment 37, in mesh with the rack 38 on the rod or core 39 of the two oppositely acting solenoids 40 and 41 carried by the frame 21. When solenoid 40 is energized, the core 39 will be drawn thereinto, turning the valve to the left, which is the open position, as shown in Fig. 3. Just before the core 39 completes its travel to the left, the lug 42 on the core engages the lug 43 on slide 31, and shifts the slide 31 to the left until stop 32 engages the frame 21. When solenoid 41 is energized, the core 39 will be drawn to the right, closing the valve. Just before the core reaches the end of its throw to the right, the lug 42 engages the lug 44 on slide 31, and shifts the slide to the right until stop 33 engages the frame 21.

The lead 45 from the positive main connects with the contacts 25 and 26 on swinging lever 23. Contact 29, on slide 31, is connected by wire 46 with one end of solenoid 40. The other contact 30 on the slide is connected by wire 47 with one end of solenoid 41. The opposite ends of the two solenoids are connected by wires 48 and 49 with the negative main. All of this is indicated in Fig. 3.

In operation, we will assume that the primary heating means has been turned off, and that the molten alloy 15 has been solidifying, and giving off its latent heat to the adjacent substances. As the material 15 freezes or crystallizes, it shrinks, and the pressure on diaphragm 20 is relieved and the lever 23 gradually swings to the left, Fig. 3. Before the material 15 has entirely crystallized, contact 25 engages contact 29. A circuit is now completed from the positive main through wire 45, contacts 25 and 29, wire 46, solenoid 40, and wire 48 to the negative main. Core 39 will be drawn to the left and the valve 35 opened and the gas turned on. A constantly burning pilot-light, or lights 50, fed through pipe 51, from below the valve 35, will ignite the burners 16. Just before core 39 completes its movement to the left, lug 42 engages lug 43, and the slide 31 is shifted slightly to the left breaking the circuit at 25 and 29, and de-energizing solenoid 40. This is the position of the parts illustrated in Fig. 3. The material 15 now commences to melt, and consequently increases its volume. This increases the air pressure in diaphragm 20, and the lever 23 is gradually swung over to the right (Fig. 3), until contact is made between 26 and 30 just before the material is entirely melted. Current now flows from the positive main through wire 45, contacts 26 and 30, wire 47, solenoid 41, and wire 49 to the negative main. The solenoid 41 will be energized and the core 39 drawn to the right, closing valve 35 and turning off the gas burners 16. Just before the core reaches its limit of movement to the right, lug 42 engages lug 44 and shifts slide 31 until stop 33 engages frame 21. This again breaks the circuit and deenergizes solenoid 41. The material 15 now commences to solidify again, and the cycle of events just described is repeated. By properly adjusting contacts 29 and 30 along the slide 31, the controller can be timed as desired. Obviously, the construction of this automatic controlling device for the valve 35 is susceptible of considerable variation, and equivalent devices for performing the same function may be susbtituted.

In the modified form of apparatus shown in Fig. 4, electric heating grids or elements 17 are enclosed within the mass of material 15 within the container. This will insure that the full heating effect of the elements is imparted to the material 15. The main switch for turning on or off the current to the elements 15 may be operated by the mechanism illustrated in Fig. 3 for controlling valve 35, or some equivalent mechanism.

It should be understood that the temperatures assumed in the above description, as well as the specific alloy referred to, were described merely by way of example, and this apparatus is capable of use throughout a wide range of temperatures. It is only necessary that the material 15 be capable of being melted by some reasonable means, and that the temperature not be higher than the softening point of the container 9. The temperature range runs from this point down to any temperature above normal, that is the material should be one that is solid at normal temperatures. Metals or alloys are best suited for this purpose.

A few examples are as follows:

| | Degrees F. |
|---|---|
| Aluminum | 1220 |
| 60% magnesium 40% antimony | 1160 |
| 88.4% aluminum 11.6% silicon | 1068 |
| 67% aluminum 33% copper | 1010 |
| Zinc | 780 |
| Lead | 625 |
| Tin | 450 |

By varying the proportions in certain alloys, materials having melting points at practically any intermediate temperatures may be located. For example, in the aluminum-silicon alloys, the melting point will vary with the percentage of silicon approximately as follows:

| Per cent silicon. | Melting point. |
|---|---|
| 0 | 1220 F. |
| 1 | 1211 |
| 2 | 1193 |
| 3 | 1184 |
| 4 | 1175 |
| 5 | 1166 |
| 6 | 1148 |
| 7 | 1139 |
| 8 | 1120 |
| 9 | 1112 |
| 10 | 1094 |
| 11 | 1076 |
| 11.6 | 1068 |

With a higher percentage of silicon the melting point rises again. The use of a eutectic composition (that is, one of lowest melting point) such as the alloy of 11.6% silicon, and 88.4% aluminum, is preferred, but not necessary, in this apparatus. By first selecting the proper metals, and then varying the percentages in the alloy, one having a melting point at practically any temperature may be determined.

It is to be understood that the application of this temperature regulator to the flattening chamber of the sheet-glass drawing machine is merely one use of the device presented in detail as an example. The same system may easily be adapted to other parts of the same machine, or other machines, wherever a steady and uniform temperature is desirable.

I claim:

1. The method of controlling the temperature in a chamber, consisting in maintaining an adjacent mass of material in a partially melted condition.

2. The method of controlling the temperature of a glass sheet, consisting in maintaining an adjacent mass of material in a partially melted condition.

3. A temperature stabilizer comprising a body of normally solid material maintained in transition between the solid and liquid states.

4. A temperature stabilizer comprising a mass of metallic substance maintained in transition between the solid and liquid states.

5. A means for maintaining a constant temperature comprising a mass of normally solid material whose melting point is somewhat higher than the desired temperature, and means for maintaining this material in a partially solid and partially liquid condition.

6. A heating means of constant temperature comprising a mass of material whose melting point is at the desired temperature, and means for maintaining this material in a partially melted condition.

7. A heating means of constant temperature comprising a mass of metal whose melting point is at the desired temperature, and means for maintaining this metal in a partially melted condition.

8. A heating means of constant temperature comprising a mass of material whose melting point is at the desired temperature, and means for heating the material at intervals to maintain it in a partially melted condition.

9. A heating means of constant temperature comprising a mass of material whose melting point is at the desired temperature, and heating means controlled by the changing volume of the material, to maintain the material in a partially melted condition.

10. A constant temperature heating means comprising a hollow container substantially filled with a mass of material having its melting point at the desired temperature, and means for keeping the material in a partially melted condition.

11. A constant temperature heating means comprising a hollow container substantially filled with a mass of material having its melting point at the desired temperature, and means for heating the material at intervals to keep it in a partially melted condition.

12. A constant temperature heating means comprising a hollow container substantially filled with a mass of material having its melting point at the desired temperature, heating means for maintaining the material in a partially melted condition, and means automatically controlled by the changing volume of the material to regulate the latter heating means.

13. A constant temperature heating means comprising a hollow container substantially filled with a mass of material having its melting point at the desired temperature, heating means for melting the material, a diaphragm controlled by the displaced air when the material changes from a liquid to a solid state or vice-versa, and means controlled by the diaphragm for turning on the latter heating means before the material entirely solidifies, and turning off this heating means before the material is entirely melted.

14. In a sheet glass drawing machine, a hollow flattening table for the sheet, a mass of material in the table whose melting point is slightly higher than the temperature at which the sheet is to be maintained, and means for keeping the material in a partially melted condition.

15. In a sheet glass drawing machine, a hollow container adjacent the path of travel of the sheet, a mass of material in the container whose melting point is slightly higher than the temperature at which the sheet is to be maintained, and means for keeping the material in a partially melted condition.

16. In a sheet glass drawing machine, a hollow flattening table for the sheet, a mass of material in the table whose melting point is slightly higher than the temperature at which the sheet is to be maintained, and means for heating the material at intervals to keep it in a partially melted condition.

17. In a sheet glass drawing machine, a hollow container adjacent the path of travel of the sheet, a mass of material in the container whose melting point is slightly higher than the temperature at which the sheet is to be maintained, and means for heating the material at intervals to keep it in a partially melted condition.

18. In a sheet glass drawing machine, a hollow container adjacent the path of travel of the sheet, a mass of material in the container whose melting point is slightly higher than the temperature at which the sheet is to be maintained, means for heating the material at intervals to keep it in a partially melted condition, and means controlled by the change in volume of the material between the solid and liquid states, to turn the heating means on or off.

19. In a sheet glass drawing machine, a hollow container adjacent the path of travel of the sheet, a mass of material in the container whose melting point is slightly higher than the temperature at which the sheet is to be maintained, means for heating the material at intervals to keep it in a partially melted condition, and pressure controlled means operated by the change in volume of the material between the solid and liquid states, which turns the heat off before the material is entirely melted, and turns the heat on before it has entirely solidified.

20. The use of latent heat of melting of materials as a means of stabilizing temperatures in a glass drawing machine.

21. In sheet glass drawing apparatus. means to draw a sheet of glass from a molten pool, including a draw-table, a draw-table support therefor comprising a container, and a mass of material therein maintained in a partially solid and partially liquid state for controlling the temperature of the said drawing means.

22. In sheet glass drawing apparatus, means for drawing a sheet from a molten pool, including a chamber, a draw-table in the chamber, a container for supporting the draw-table, and a mass of material in the container whose melting point is slightly higher than the temperature desired in said chamber, and means for keeping the material in a partially melted condition.

23. In sheet glass apparatus, means for drawing a sheet of glass from a mass of molten glass, including a draw table, and means to automatically and directly maintain the draw table substantially at a predetermined temperature.

Signed at Charleston, in the county of Kanawha, and State of West Virginia, this 24th day of February, 1923.

WILLIAM A. GIBSON.